United States Patent
Goins et al.

(10) Patent No.: US 9,454,254 B2
(45) Date of Patent: *Sep. 27, 2016

(54) WET INK TEXTURE ENGINE FOR REDUCED LAG DIGITAL INKING

(71) Applicant: Microsoft Technology Licensing, LLC, Redmond, WA (US)

(72) Inventors: Robert Goins, Jersey City, NJ (US); Sergey Ten, Redmond, WA (US); Edward Augustus Layne, Jr., Seattle, WA (US); Mario Baumann, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/145,913

(22) Filed: May 4, 2016

(65) Prior Publication Data

US 2016/0253301 A1  Sep. 1, 2016

Related U.S. Application Data

(63) Continuation of application No. 14/065,139, filed on Oct. 28, 2013, now Pat. No. 9,360,956.

(51) Int. Cl.
*G06F 3/041* (2006.01)
*G06K 9/00* (2006.01)

(52) U.S. Cl.
CPC .......... *G06F 3/0412* (2013.01); *G06K 9/00402* (2013.01)

(58) Field of Classification Search
CPC ....... G06F 3/038; G06F 3/04883; G06F 3/12
See application file for complete search history.

(56) References Cited

U.S. PATENT DOCUMENTS

| | | | |
|---|---|---|---|
| 7,450,261 B2 | 11/2008 | Dodge et al. | |
| 7,499,058 B2 | 3/2009 | Van Ness et al. | |
| 9,360,956 B2 | 6/2016 | Goins et al. | |
| 2005/0088420 A1* | 4/2005 | Dodge | G06F 3/038 345/173 |
| 2011/0279379 A1* | 11/2011 | Morwing | G06F 3/0237 345/173 |
| 2011/0310118 A1 | 12/2011 | Asmi et al. | |

FOREIGN PATENT DOCUMENTS

| | | |
|---|---|---|
| EP | 2386984 A2 | 11/2011 |
| WO | 9722947 A1 | 6/1997 |

OTHER PUBLICATIONS

International Search Report and Written Opinion Issued in PCT Application No. PCT/US2014/061659, Mailed Date: Jan. 26, 2015, 9 pages.

(Continued)

*Primary Examiner* — Larry Sternbane
*Assistant Examiner* — Sepehr Azari
(74) *Attorney, Agent, or Firm* — Jessica M. Meyers; Tom Wong; Micky Minhas

(57) ABSTRACT

A wet ink texture engine and associated method. The wet ink texture engine may run in the context of any application on any device, service, or general endpoint capable of receiving ink input. For example, the wet ink texture engine may be used in the context of a note application that receives input in the form of writing or drawing. The wet ink texture engine reduces, minimizes, or eliminates lag between receiving the input and displaying the input to improve inking experience for the user.

20 Claims, 8 Drawing Sheets

(56) References Cited

OTHER PUBLICATIONS

"The Ink Threading Model", Published on: Oct. 4, 2011, Available at: http://msdn.microsoft.com/en-us/library/ms788744.aspx, 4 pgs.
"Custom Rendering Ink", Published on: Mar. 25, 2009, Available at: http://msdn.microsoft.com/en-us/library/ms747347.aspx, 6 pgs.
"Accessing and Manipulating Stylus Input", Published on: Oct. 10, 2011, Available at: http://msdn.microsoft.com/en-us/library/windows/desktop/ms704 I 72(v=vs.85).aspx, 1 page.
"Basic Recognition and Ink Analysis", Published on: Apr. 19, 2012, Available at:http://msdn.microsoft.com/en-us/library/windows/desktop/ms701686(v=vs.85).aspx, 6 pgs.
"Architecture of the StylusInput APIs", Retrieved on: Aug. 27, 2013, Available at: http://msdn.microsoft.com/en-IN/library/ms818251.aspx, 3 pgs.
PCT International Preliminary Report on Patentability dated Feb. 3, 2016 in Application No. PCT/US2014/061659, 11 pages.
International Written Opinion Issued in PCT Application No. PCT/US2014/061659, Mailed Date: Sep. 4, 2015, 4 pages.

* cited by examiner

WET INK TEXTURE ENGINE FOR REDUCED LAG DIGITAL INKING

CROSS-REFERENCE TO RELATED APPLICATIONS

This application is a continuation application of U.S. patent application Ser. No. 14/065,139 (now U.S. Pat. No. 9,360,956), entitled "WET INK TEXTURE ENGINE FOR REDUCED LAG DIGITAL INKING," filed on Oct. 28, 2013, the entire disclosure of which is hereby incorporated herein by reference.

BACKGROUND

Computers, tablets, smart phones, and other computing devices adopting natural user interfaces (NUIs) allowing users to input information as handwriting or drawings by writing directly on the screen or a digitizer are increasingly common. The process of receiving and rendering written or drawn information from a stylus is referred to as inking. The stylus may be a digital pen, mouse, finger or other suitable device that can be used to write or draw on the screen or digitizer. During inking, each move sequence of the stylus is recorded as a stroke storing the coordinates of and properties associated with the input. For example, a stroke may include the movements from the time when the pen tip is moved closed enough to be detected by the digitizer, the mouse button is depressed, or the finger touches the screen until the time that pin tip is moved away from the digitizer and no longer detectable, the mouse button is released, or the finger is no longer touching the screen. One or more strokes make up the ink (i.e., digital ink) used with applications running on the computing device.

On screen, the ink may appear as natural-looking handwriting or hand drawn pictures. In the case of handwriting, the ink may be converted to standard text through handwriting recognition. The converted text may be associated with the corresponding natural-looking handwriting as an alternate data format useful when working with (e.g., searching) inked information or may replace the natural-looking handwriting on screen and in the application (e.g., creating a typed document).

At times, the ink drawn on the screen severely lags behind the stylus. This lag is a result of the application attempting to do three actions simultaneously: process the ink input, render the ink to the screen, and save the ink to the application canvas (i.e., what the application displays to the user). Attempting to accomplish all of these tasks simultaneously slows each of them down because the user interface pipeline backs up quickly.

Lag is especially problematic for single-threaded applications, but remains a concern even for multi-threaded applications. In a multi-threaded application, lag may be addressed by creating additional threads and handling each action in a separate thread; however, this solution is not available for single-threaded applications and may not be viable or suitable for all multi-threaded applications.

When saving ink to the application canvas, lag may occur as a result of hardware timing constraints. For example, updates to the application canvas may be tied to the screen refresh frequency while input devices, such as the stylus, operate at the system bus speed. In a typical example, screens are refreshed on a 60 Hz cycle while the system bus operates at 133 Hz. Limited to one update of the application canvas per screen refresh (i.e., frame), the stylus generates ink more than twice as fast as it can be displayed by the application. As the user continues to write or draw, the ink lags further and further behind the stylus and is displayed to the user in choppy bursts rather than smoothly appearing with the movements of the stylus.

Different combinations of hardware and software have been found to produce significant lag where the ink does not appear for six or seven frames, which translates to the ink trailing the stylus by one to two inches. At a minimum, lag detracts from the pen and paper experience that inking is designed to provide. More than just being noticeable, lag creates efficiency and usability problems when the user has to stop and wait for the ink to catch up with the stylus so the user can see or make changes to what has been written or drawn. It is with respect to these and other considerations that the present invention has been made. Although relatively specific problems have been discussed, it should be understood that the embodiments disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments described in the present disclosure provide for a wet ink texture engine that may run in the context of any application on any device, service, or general endpoint capable of receiving ink input. Ink input begins when the user starts writing or drawing with ink. Original ink rendering happens continuously and frequently while the user is actively producing ink strokes. Original ink is viewable but has not yet been transferred to the application for which the ink input is intended. The process of rendering of the original ink is referred to as wet inking. Wet inking reduces user perceptible lag between the time when the user moves the stylus and the time ink appears on the screen. Ink input stops when there is break in the active production of ink strokes. When this happens, original ink strokes are passed to an ink analysis component to produce final ink. The process of replacing of original ink with final ink is referred to as dry inking.

During wet inking, the original ink is cached in the wet ink texture. The wet ink texture is composed of wet ink and semi-dry ink. The application canvas stores the virtual texture holding the ink captured by and available in, to, and from the application (i.e., dry ink). Wet ink is stored in the input layer, and the semi-dry ink is stored in the transfer layer. Each layer is a virtual frame buffer used to hold the original ink at different stages in the wet inking process. The original ink input is rendered in the input layer. The image stored in the input layer is an unprocessed representation of the most recent ink data received, including partial strokes. Frequently presenting the input layer for display minimizes user perceptible lag between the time when the user moves the stylus and the time ink appears on the screen.

After being rendered, wet ink is moved to the transfer layer. The transfer layer serves as an intermediate frame buffer for wet ink that is ready is to be committed to or consumed by the application (i.e., semi-dry ink). The transfer involves removing at least some of the rendered wet ink from the input layer and re-rendering it in the transfer layer as semi-dry ink. The image stored in the transfer layer is an unprocessed representation of wet ink that has been rendered and is ready to be moved (i.e., committed) to the application canvas.

During dry inking, at least a portion of the ink in the wet ink texture is moved to the virtual texture of the application canvas. When the application is ready to accept any available semi-dry ink, the application requests the contents of the transfer layer. The semi-dry ink is re-rendered in the virtual texture of the application canvas and the transfer layer is cleared. The flow continues until all ink is transferred from the wet ink texture to the virtual texture.

In various embodiments, the wet ink texture engine provides at least one dedicated worker thread to receive and render ink input. Regardless of number, these worker threads are independent from the user interface (UI) thread that becomes sluggish as activity increases. Ink input happens on a dedicated ink input thread and is marshaled to a dedicated ink render thread. Rendering of the raw (i.e., wet) ink in the input layer happens on the ink render thread without any further processing of the wet ink at this time. Receiving input and rendering wet ink occurs with high priority. Once rendered, the wet ink is presented to the system compositor and displayed to the user at the next screen update. In other words, the wet ink appears on screen with minimal user perceivable lag between the time that the input is received and the time that it is displayed.

Transfer of the rendered wet strokes to the transfer layer happens on the ink render thread. The transfer may occur at lower priority than receiving input and rendering wet ink to allow the wet ink to be displayed as rapidly as possible. Following a transfer, the wet ink and the semi-dry ink are presented to the system compositor at the same or substantially the same time and displayed to the user at the next screen update. Transferring the semi-dry ink to the application as dry ink involves locking the transfer layer, re-rendering the semi-dry ink on the application canvas, and clearing the transfer layer. Once the transfer layer is locked, the semi-dry ink is marshaled to the application thread, which renders it on the application canvas as dry ink. After the dry ink has been rendered, the transfer layer is cleared and unlocked by the ink render thread.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

Various embodiments of a wet ink texture engine are described herein and illustrated in the accompanying figures. The wet ink texture engine may run in the context of any application on any device, service, or general endpoint capable of receiving ink input. For example, the wet ink texture engine may be used in the context of a note application that receives input in the form of writing or drawing. The wet ink texture engine reduces, minimizes, or eliminates lag between receiving the input and displaying the input to improve inking experience for the user.

Figure 1:
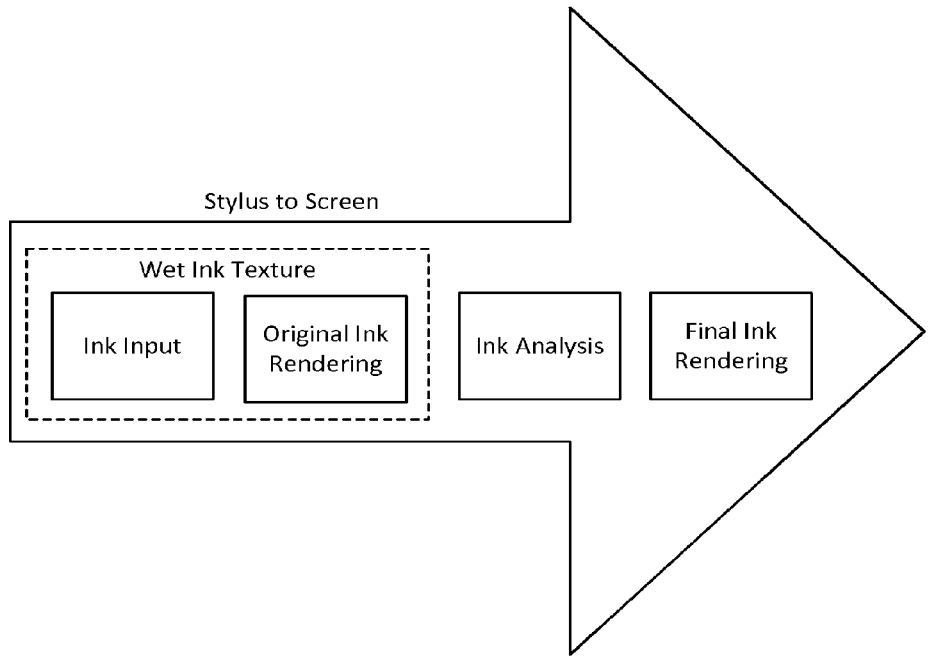
FIG. 1 illustrates the general flow of ink from input to screen for an application utilizing the wet ink texture engine.

FIG. 1 illustrates the general flow of ink from input to screen for an application utilizing the wet ink texture engine. Ink input begins when the user starts writing or drawing with ink. Examples of events signifying the start of ink input include, but are not limited to, a digital pen moving into range of the digitizer, pressing a mouse button, making finger contact with a touch screen, and activating an ink input mode in which hand movements detected by an object-tracking electronic sensor to be interpreted as writing or drawing. Original ink rendering happens continuously and as frequently as possible while the user is actively producing ink strokes. Original ink is viewable but has not yet been transferred to the application for which the ink input is intended. The process of rendering of the original ink is referred to as wet inking. Wet inking reduces user perceptible lag between the time when the user moves the stylus and the time ink appears on the screen.

Ink input stops when there is break in the active production of ink strokes. Examples of events signifying the end of ink input include, but are not limited to, a digital pen moving out of range of the digitizer, releasing the mouse button, ceasing finger contact with the touch screen, and deactivating the ink input mode. When this happens, original ink strokes are passed to an ink analysis component to produce final ink. The process of replacing of original ink with final ink is referred to as dry inking. At a minimum, the ink analysis component commits the ink to application; however, the ink analysis component may perform additional optional processing of the ink. Dry inking triggers re-rendering of original ink because dry inking involves deleting original ink strokes when rendered as final ink.

Figure 2:
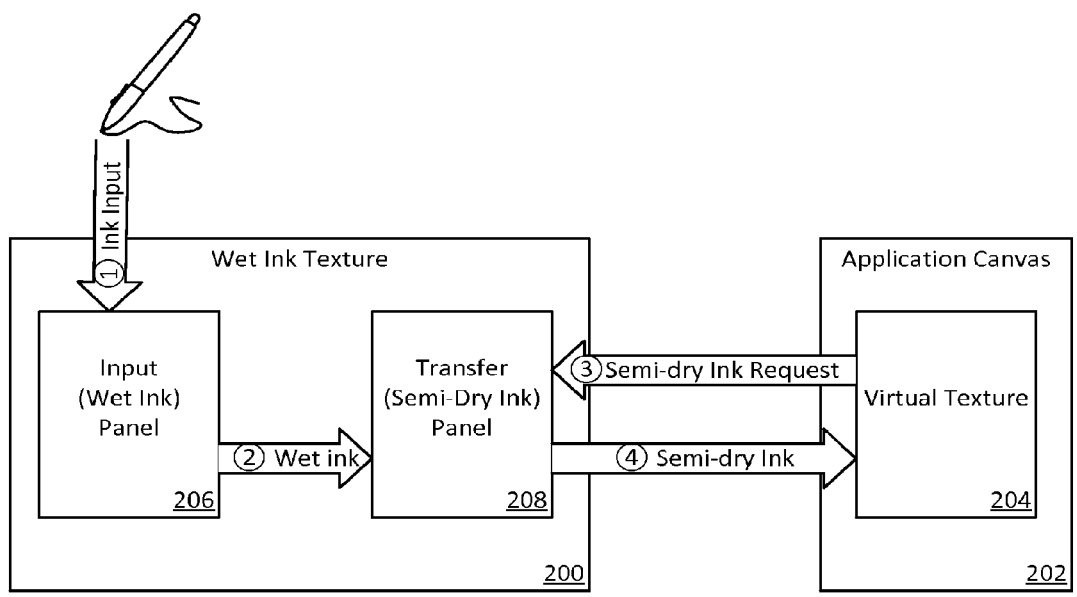
FIG. 2 illustrates one embodiment of the flow of ink between the wet ink texture produced during wet inking and the virtual texture produced during dry inking.

FIG. 2 illustrates one embodiment of the flow of ink between the wet ink texture produced during wet inking and the virtual texture produced during dry inking. During wet inking, the original ink is cached in the wet ink texture 200. The wet ink texture 200 is composed of wet ink and semi-dry ink. The wet ink is texture 200 frequently updated and displayed to the user; however, the wet ink in the wet ink texture 200 is not usable by the application until dry inking occurs. The application canvas 202 stores the virtual texture 204 holding the ink captured by and available in, to, and from the application (i.e., dry ink).

The wet ink and the semi-dry ink are stored in separate layers. Wet ink is stored in the input (i.e., wet ink) layer 206, and the semi-dry ink is stored in the transfer (i.e., semi-dry ink) layer 208. Each layer is a virtual frame buffer used to hold the original ink at different stages in the wet inking process. The layers and the application canvas 202 may be implemented as objects (e.g., bitmaps, rasterized images, or swap chains) accessible through an application programming interface (API) handling tasks related to displaying graphics (e.g., DirectX), controls (e.g., swap chain layers) in a visual presentation markup language, such as the Extensible Application Markup Language (XAML), or managed rendering surfaces using a visual presentation markup language to manage the interactions between the graphics display API and the image source. In various embodiments, the application canvas 202 is a managed rendering surface, such as a Virtual Surface Image Source (VSIS) or a Surface Image Source (SIS), and the input layer 206 and transfer (i.e., semi-dry ink) layers are swap chain layers.

The original ink input is rendered in the input (i.e., wet ink) layer. The image stored in the input layer 206 is an unprocessed (i.e., raw) representation of the most recent ink data received, including partial strokes. Frequently presenting the input layer 206 for display minimizes user perceptible lag between the time when the user moves the stylus and the time ink appears on the screen.

After being rendered, wet ink is moved to the transfer (i.e., semi-dry ink) layer. The transfer layer 208 serves as an intermediate frame buffer for wet ink that is ready is to be committed or consumed to the application (i.e., semi-dry ink). The transfer involves removing at least some of the rendered wet ink from the input layer 206 and re-rendering it in the transfer layer 208 as semi-dry ink. The image stored in the transfer layer 208 is an unprocessed representation of wet ink that has been rendered and is ready to be moved (i.e., committed) to the application canvas.

During dry inking, at least a portion of the wet ink is moved to the virtual texture 204 of the application canvas. When the application is ready to accept any available semi-dry ink, the application requests the contents of the transfer layer. The semi-dry ink is re-rendered in the virtual texture 204 of the application canvas 202 and the transfer layer 208 is cleared. The flow continues until all ink is transferred from the wet ink texture 200 to the virtual texture.

Figure 3:
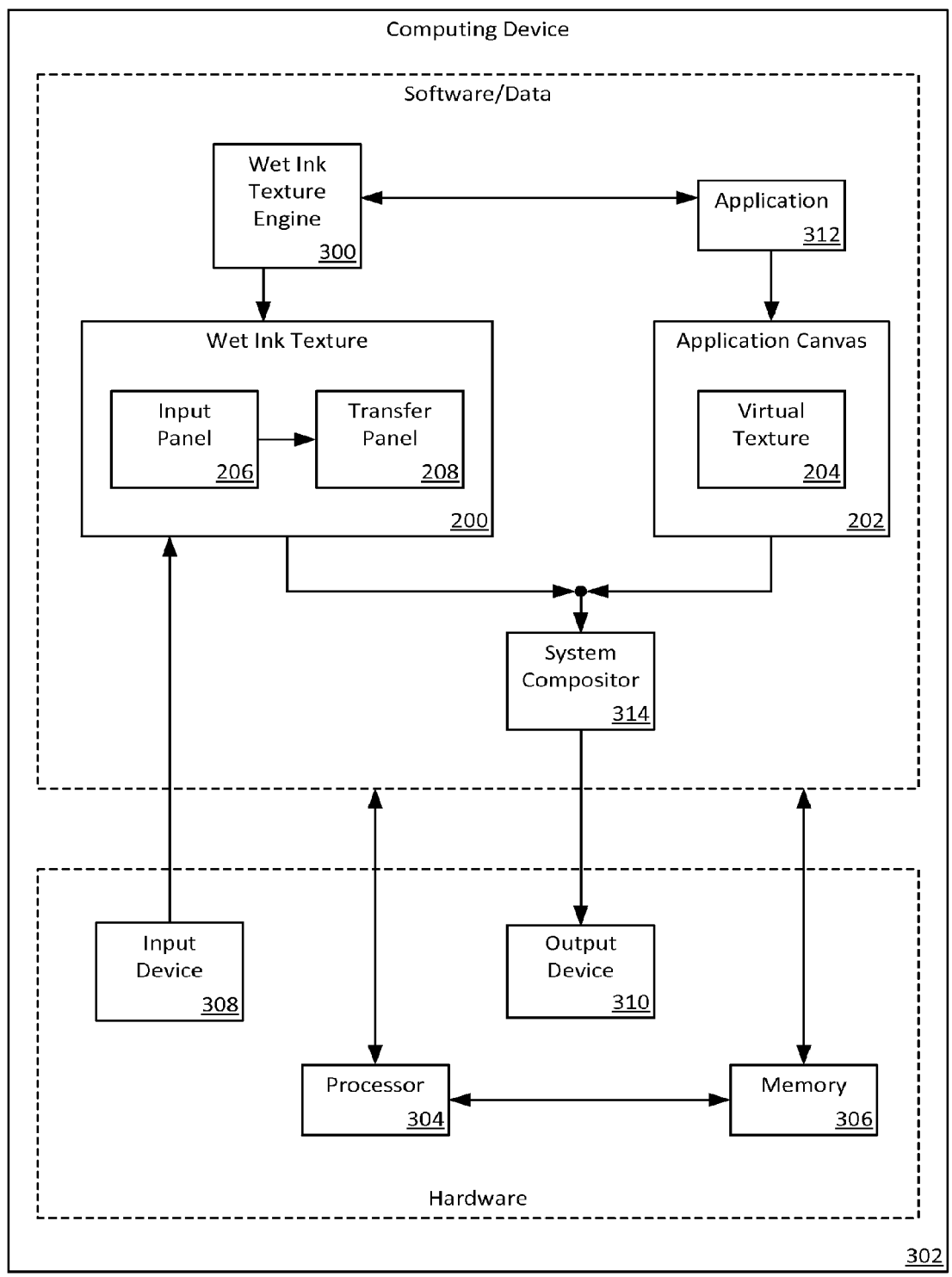
FIG. 3 illustrates one embodiment of the wet ink texture engine in a basic computing system environment.

FIG. 3 illustrates one embodiment of the wet ink texture engine in a basic computing system environment. The wet ink texture engine 300 runs on a computing device 302. The computing device generally includes hardware components including a processor 304, a memory 306, an input device 308, and an output device 310. The processor 304 executes the software components including, but not limited to, the wet ink texture engine 300, the application 312, and the system compositor 314, and performs other logical and control functions. The memory 306 stores the software components and associated data including, but not limited to, the wet ink texture 200, the virtual texture 204, the input layer 206, and the transfer layer 208. Examples of suitable computing devices usable with the wet ink texture engine 300 include, but not limited to, desktop computers, laptop computers, tablet computers, surface computers, and smart phones.

The input device 308 is a coordinate-based input device. In various embodiments of the input device, a stylus is used for inking (i.e., writing or drawing on) a surface. In some embodiments, the stylus is an active component (e.g., a digital pen or mouse) that produces a coordinate-based input as it moves. An active stylus may be used with a passive surface (e.g., a piece of paper, mouse pad, or desktop). In other embodiments, the surface is the active component (e.g., a digitizer or touch screen) that produces a coordinate-based input based on the position and movement of the user's finger, a digital pen, or other stylus (either active or passive). In some embodiments, the input device 308 is an electronic sensor that produces a coordinate-based input based on movement of a user's body (e.g., a finger, hand, or arm) or other object relative to a screen image displayed or projected on a large surface (e.g., a wall, table, or digital whiteboard). In various embodiments, the electronic sensor operates based on infrared, ultrasonic, thermal, laser, or other vision- or sonic-based sensing technology suitable for tracking an object. One example of a suitable electronic sensor is a Microsoft® Kinect® sensor. It should be appreciated that the input device 308 may also be used for inputs other than inking.

The output device 310 is a visual display device for presenting information, including the application user interface and ink to the user. Examples of suitable output devices include, but are not limited to, display screens, monitors, projectors, and digital white boards. As previously mentioned, the layers and the application canvas 202 are combined to produce the final image displayable on the output device 310. For example, the wet ink texture engine 300 may present each of the layers to a system compositor 314 running on the computing device while the application may present the application canvas 202 to the system compositor 314. The system compositor 314 receives image sources from the applications running on the computing devices and composes the final image that is displayed on the screen.

The wet ink texture engine 300 operates in conjunction with an application capable of receiving ink through the coordinate-based input device. For example, the wet ink texture engine 300 may operate in conjunction with an application 312 (e.g., a note application, drawing application, or an operating system) running on the computing device. In various embodiments, the wet ink texture engine 300 is an integrated component of the application. In other embodiments, the wet ink texture engine 300 and the application are separate but interactive components. For example, the wet ink texture engine 300 may be a service, add-in, interface, applet, or other software component callable by or otherwise working with the application to process ink inputs.

Figure 4:
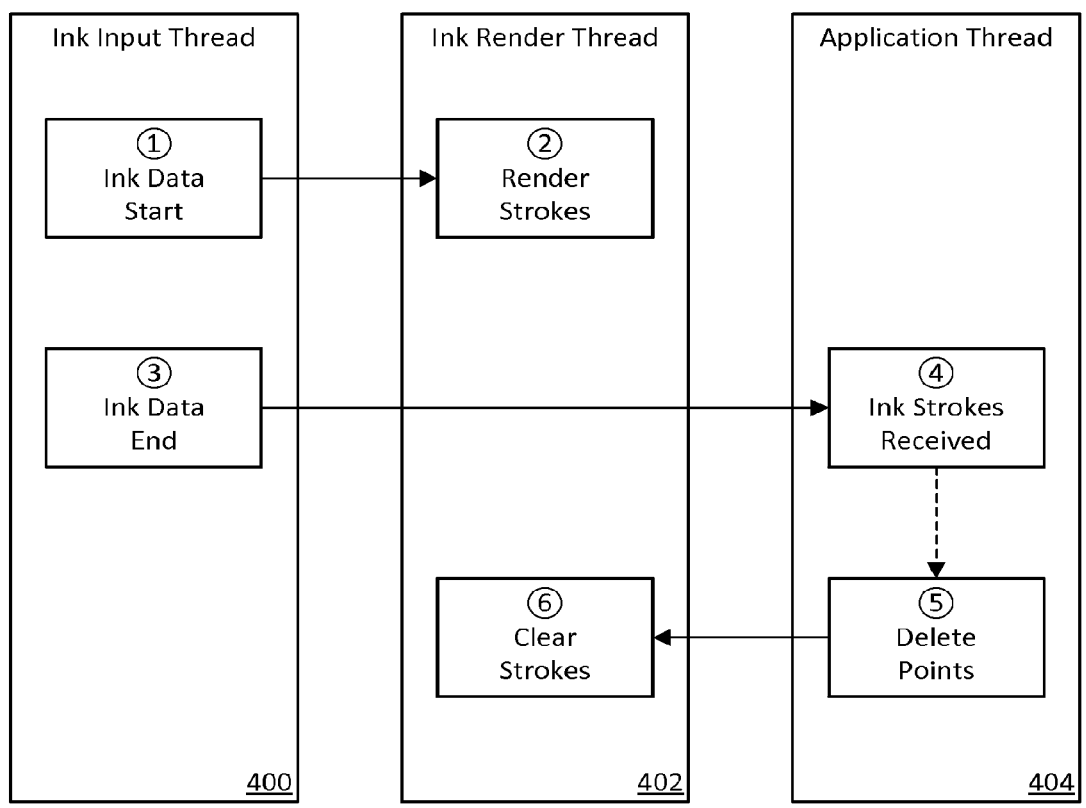
FIG. 4 illustrates the relationship between the threads associated with a single-threaded application utilizing one embodiment of the wet ink texture engine.

FIG. 4 illustrates the relationship between the threads associated with a single-threaded application utilizing one embodiment of the wet ink texture engine. The wet ink texture engine 300 may be used with both single- and multi-threaded applications; however, greater benefit may be experienced with single-threaded applications and multi-threaded applications having a single thread for receiving, rendering, and processing inputs. In various embodiments, the wet ink texture engine 300 provides two dedicated worker threads to receive and render ink input. In other embodiments, the wet ink texture engine 300 provides a single dedicated worker thread to receive and render ink input. Regardless of number, these worker threads are independent from the single application or user interface (UI) thread that becomes sluggish as activity increases.

Ink input happens on a dedicated ink input thread 400 and is marshaled to a dedicated ink render thread 402. Rendering of the raw (i.e., wet) ink in the input layer 206 happens on the ink render thread 402 without any further processing of the wet ink at this time. Receiving input and rendering wet ink occurs with high priority. Once rendered, the wet ink is presented to the system compositor and displayed to the user at the next screen update. In other words, the wet ink appears on screen with minimal user perceivable lag between the time that the input is received and the time that it is displayed.

Transfer of the rendered wet strokes to the transfer layer 208 happens on the ink render thread 402. The transfer may occur at lower priority than receiving input and rendering wet ink to allow the wet ink to be displayed as rapidly as possible. In some embodiments, the semi-dry ink conversion occurs substantially contemporaneously with rendering the wet ink. In other embodiments, the semi-dry ink conversion occurs at a break in ink input. In such cases, the transfer layer 208 will only contain complete strokes, which may be useful to facilitate optional processing when the semi-dry ink strokes are committed to the application.

Following a transfer, the wet ink and the semi-dry ink are presented to the system compositor 314 at the same or substantially the same time and displayed to the user at the next screen update. Waiting to present the input layer 206 with the transfer layer 208 once the semi-dry ink has been rendered, instead of presenting the input layer 206 immediately after the wet ink has been removed, works to maintain the visual fidelity of the ink display. For example, synchronizing the presentation of the input and transfer layers minimizes user perceived flicker that might result from the displaying the input and transfer layers after the wet ink has been removed and before it has been re-rendered as semi-dry ink.

Transferring the semi-dry ink to the application as dry (i.e., committed) ink involves locking the transfer layer 208, re-rendering the semi-dry ink on the application canvas 202, and clearing the transfer layer 208. Once the transfer layer 208 is locked, the semi-dry ink is marshaled to the application on the application thread 404, which renders it on the application canvas as dry ink. In various embodiments, the application thread 404 is the UI thread. In other embodiments, the application thread 404 is a dedicated worker thread for rendering ink to the application canvas 202. After the dry ink has been rendered, the transfer layer 208 is cleared and unlocked by the ink render thread 402. In various embodiments, the application thread 404 sends a request for the ink render thread 402 to delete the contents of the transfer layer 208 after rendering the dry ink.

As discussed above, the application may periodically poll the wet ink texture engine 300 to determine if semi-dry ink is available. In some embodiments, the wet ink texture engine 300 may provide notification to the application at a break in ink input and/or at the end semi-dry ink conversion. Committing semi-dry ink to the application may occur at lower priority than receiving and rendering wet ink and/or converting wet ink to semi-dry ink. In some embodiments, committing semi-dry ink may only occur when sufficient resources are available to minimize the likelihood of causing user perceptible ink lag. For example, committing semi-dry ink may only occur when processor utilization is below a threshold level.

In various embodiments, the application thread 404 performs optional processing before or after rendering the dry ink. In some embodiments, the semi-dry ink strokes are smoothed before being rendered to the application canvas. In some embodiments, the semi-dry ink strokes are subjected to character recognition processing to identify ink corresponding to writing. The results of character recognition may be used to enhance the appearance of handwritten text (e.g., to improve legibility or aesthetic quality) or to create an object containing standard characters (e.g., ASCII, Unicode, or other computer readable text) corresponding to the handwritten text to facilitate use (e.g., indexing or full text searching) of the information represented by the ink by the application or other software accessing the application data. Such additional processing is generally, but not necessarily, provided separately and independently from the wet ink texture engine.

Figure 5:
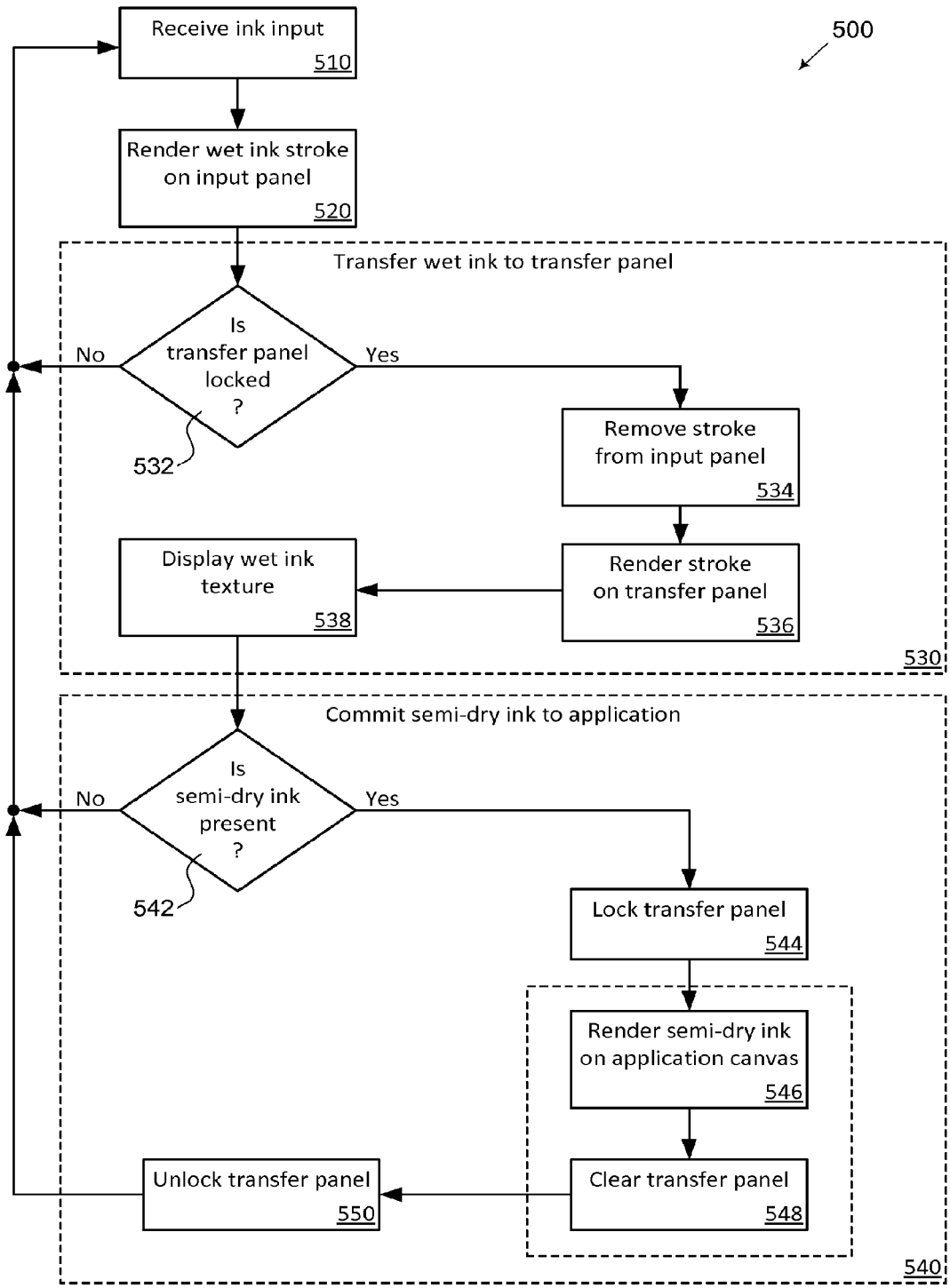
FIG. 5 illustrates one embodiment of the wet inking method performed by the wet ink texture engine.

FIG. 5 illustrates one embodiment of the wet inking method facilitated by the wet ink texture engine. The wet inking method 500 begins with the user writing or drawing an ink input. As the user writes or draws, the wet ink input operation 510 captures the ink. The wet ink rendering operation 520 renders the ink in the input layer 206 and presents the input layer 206 for display as the system continues to receive ink input. After the wet ink is rendered, a semi-dry transfer operation 530 moves each stroke to the transfer layer. Moving the stroke from the input layer 206 to the transfer layer 208 involves multiple operations. First, a lock check operation 532 determines whether the transfer layer 208 is locked. If locked, strokes cannot be moved to the transfer layer 208. If the transfer layer 208 is not locked, a wet stroke removal operation 534 deletes the stroke being moved from the input layer. Finally, the semi-dry rendering operation 536 renders the stroke being moved in the transfer layer 208. Once the stroke has been moved, the synchronized presentation operation 538 presents both the input and transfer layers for display. By contemporaneously presenting both the input layer 206 and the transfer layer 208 for display, the transfer of the stroke is virtually unnoticeable to user.

Semi-dry ink rendered in the transfer layer 208 is available to be committed to the application canvas 202 in the semi-dry ink commit operation 540. In various embodiments, the semi-dry ink commit operation 540 begins with a semi-dry ink availability operation 542 that confirms the availability of semi-dry ink in response a request from the application thread. If semi-dry ink is available, the transfer layer lock operation 544 locks the transfer layer 208. Locking the transfer layer 208 prevents freshly-rendered wet ink from being converted to semi-dry ink. While the transfer layer 208 is locked, wet ink continues to accumulate in the input layer 206 and be displayed to the user. Once the transfer layer 208 is locked, the dry ink render operation 546 re-renders the semi-dry ink in the transfer layer on the application canvas. Once the dry ink has been rendered, the transfer layer clear operation 548 deletes the semi-dry ink in the transfer layer 208. After the transfer layer 208 is cleared, the transfer layer unlock operation 550 unlocks the transfer layer 208.

Locking the transfer layer 208 keeps the semi-dry ink committed to the application separate from wet ink received during the commit operation. By locking the transfer layer 208, only the semi-dry ink that is actually committed to the application is cleared. Without the lock, wet ink converted to semi-dry ink after the application thread 404 collects the available semi-dry ink and before the transfer layer 208 would be cleared and lost.

Figure 6A:
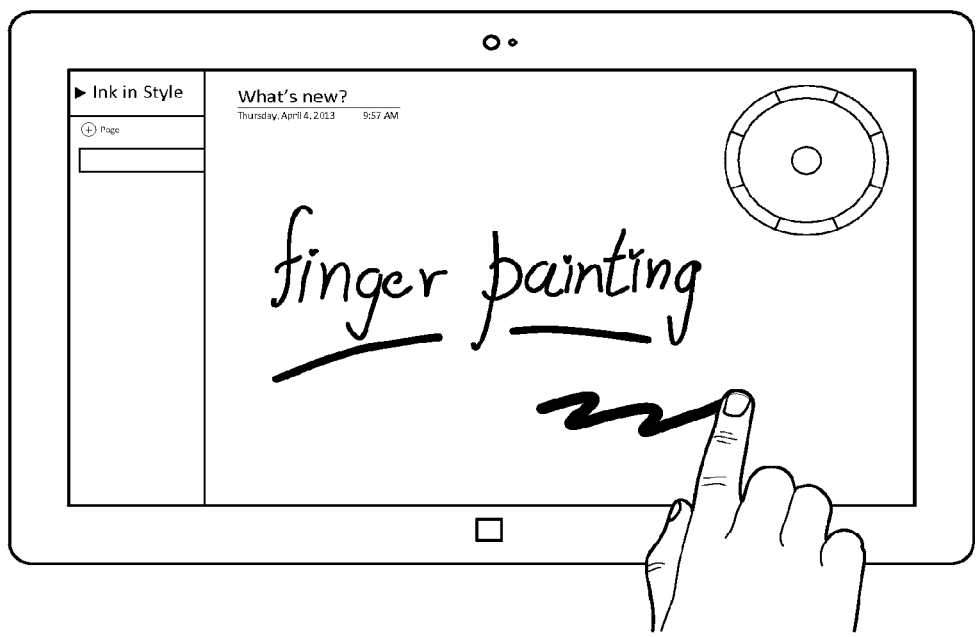
FIG. 6A illustrates ink entered on a touch screen using a finger, without user perceptible lag, in an application utilizing one embodiment of the wet ink texture engine.
Figure 6B:
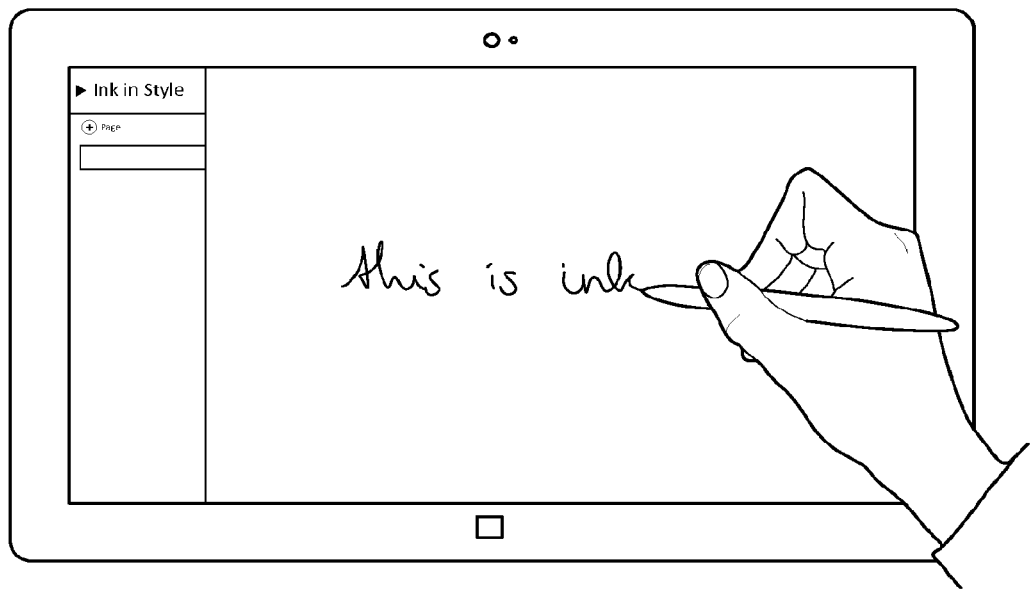
FIG. 6B illustrates ink entered on a digitizer using a digital pen, without user perceptible lag, in an application utilizing one embodiment of the wet ink texture engine.

The subject matter of this application may be practiced in a variety of embodiments as systems, devices, and other articles of manufacture or as methods. Embodiments may be implemented as hardware, software, computer readable media, or a combination thereof. The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers. FIGS. 6A and 6B, respectively, show ink being entered, without user perceptible lag, in an application utilizing one embodiment of the wet ink texture engine 300 using a finger with a touch screen-based computing device and using a digital pen with a computing device having a digitizer.

User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
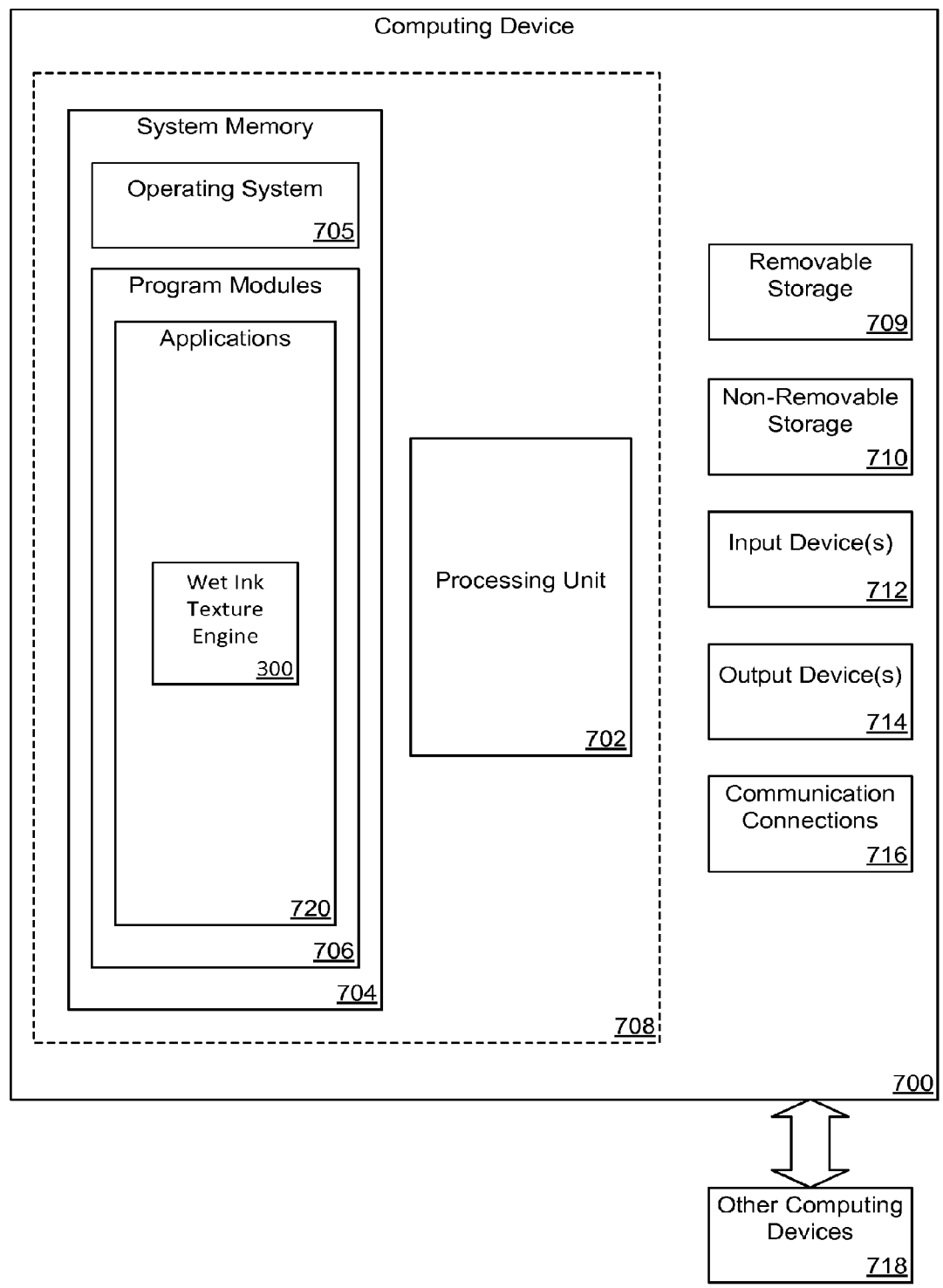
FIG. 7 is a block diagram illustrating one embodiment of the physical components of a computing device with which embodiments of the invention may be practiced.

FIGS. 7 and 8 and the associated descriptions provide a discussion of a variety of operating environments in which embodiments of the invention may be practiced. However, the devices and systems illustrated and discussed are for purposes of example and illustration and are not limiting of a vast number of computing device configurations that may be utilized for practicing embodiments of the invention described above.

FIG. 7 is a block diagram illustrating physical components (i.e., hardware) of a computing device 700 with which embodiments of the invention may be practiced. The computing device components described below may be suitable for embodying computing devices including, but not limited to, a personal computer, a tablet computer, a surface computer, and a smart phone, or any other computing device discussed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such as the wet ink texture engine 300. For example, the operating system 705 may be suitable for controlling the operation of the computing device 700. Furthermore, embodiments of the invention may be practiced in conjunction with a graphics library, other operating systems, or any other application program and is not limited to any particular application or system. This basic configuration is illustrated by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated by a removable storage device 709 and a non-removable storage device 710.

As stated above, a number of program modules and data files may be stored in the system memory 704. While executing on the processing unit 702, the software applications 720 may perform processes including, but not limited to, one or more of the stages of the wet inking method 500. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the illustrated components may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein with respect to the software applications 720 may be operated via application-specific logic integrated with other components of the computing device 700 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 700 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all examples of computer storage media (i.e., memory storage.) Computer storage media may include random access memory (RAM), read only memory (ROM), electrically erasable read-only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700.

Figure 8A:
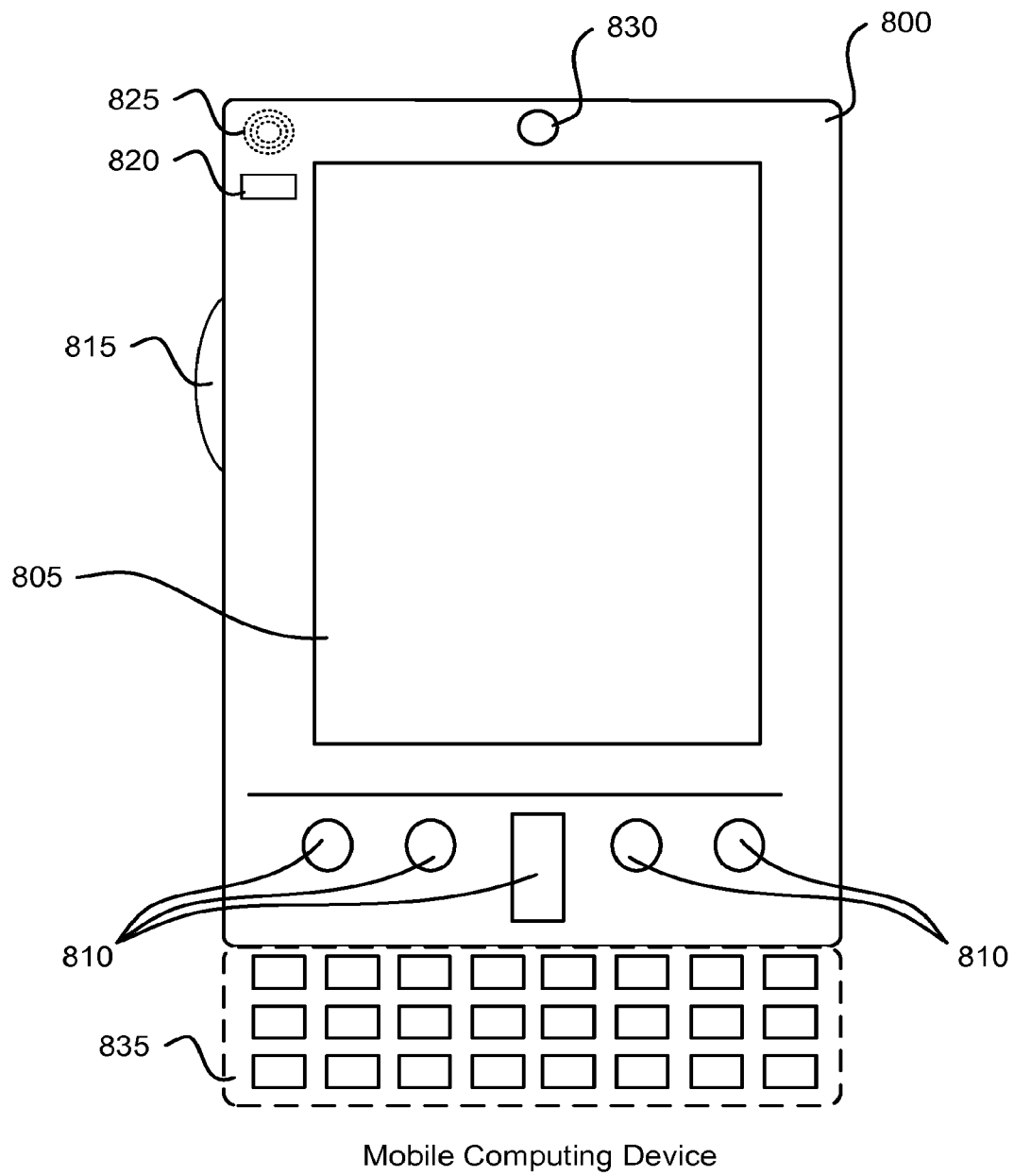
FIGS. 8A and 8B are simplified block diagrams of a mobile computing device with which embodiments of the present invention may be practiced.
Figure 8B:
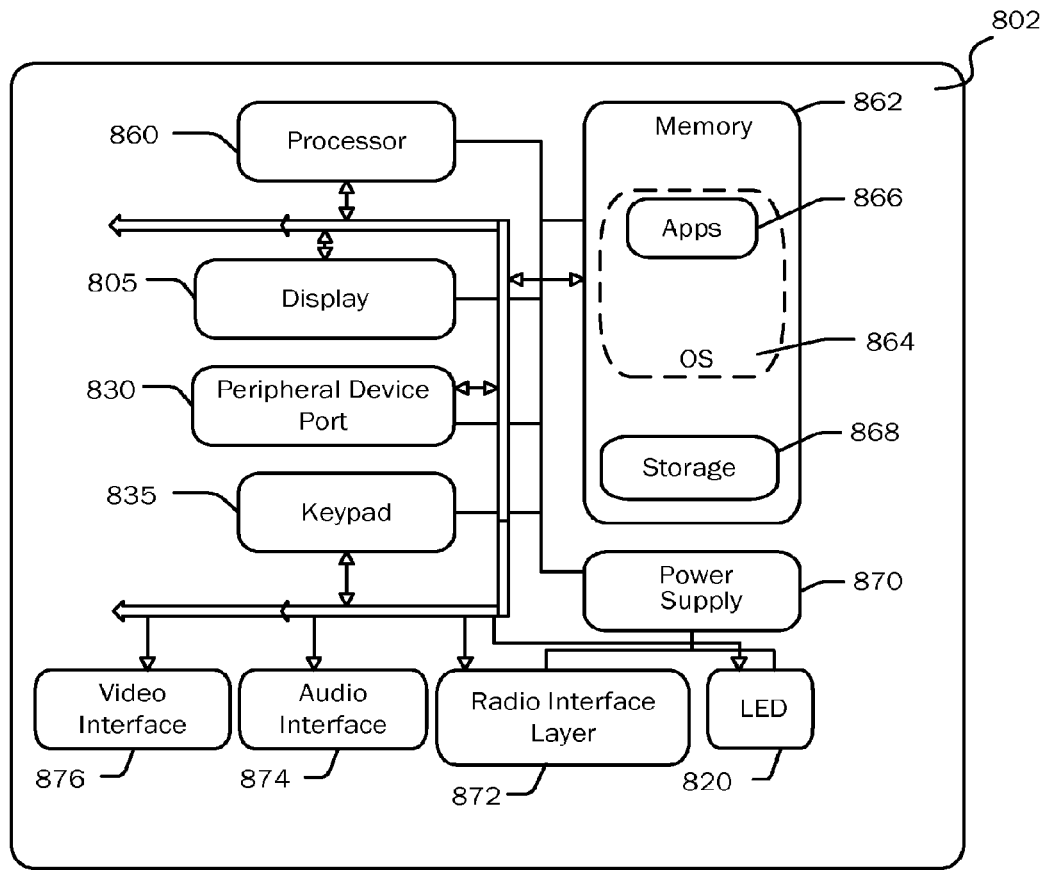

FIGS. 8A and 8B illustrate a mobile computing device 800 with which embodiments of the invention may be practiced. Examples of suitable mobile computing devices include, but are not limited to, a mobile telephone, a smart phone, a tablet computer, a surface computer, and a laptop computer. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device 308 (e.g., a touch screen display). If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface, a visual indicator 820 (e.g., a light emitting diode), and/or an audio transducer 825 (e.g., a speaker). In some embodiments, the mobile computing device 800 incorporates a vibration transducer for providing the user with tactile feedback. In yet another embodiment, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 800 can incorporate a system (i.e., an architecture) 802 to implement some embodiments. In one embodiment, the system 802 is implemented as a smart phone capable of running one or more applications (e.g., browsers, e-mail clients, notes, contact managers, messaging clients, games, and media clients/players). In some embodiments, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including software applications 720 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the outside world via a communications carrier or service provider. Transmissions to and from the radio 872 are conducted under control of the operating system 864. In other words, communications received by the radio 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present invention, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

The description and illustration of one or more embodiments provided in this application are intended to provide a complete thorough and complete disclosure the full scope of the subject matter to those skilled in the art and not intended to limit or restrict the scope of the invention as claimed in any way. The embodiments, examples, and details provided in this application are considered sufficient to convey possession and enable those skilled in the art to practice the best mode of claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method comprising:
   receiving ink input;
   rendering, in a first layer of a virtual buffer, the received ink input as wet ink;
   re-rendering, in a second layer of the virtual buffer, the wet ink as semi-dry ink;
   transmitting a portion of the semi-dry ink and a portion of the wet ink to an application canvas; and
   displaying, within the application canvas, dry ink that comprises the portion of the wet ink and the portion of the semi-dry ink.

2. The method according to claim 1, wherein the dry ink is a digital representation generated by synchronously displaying the portion of the wet ink and the portion of the semi-dry ink within the application canvas of an application executing on a processing device.

3. The method according to claim 2, wherein the displaying displays the portion of the wet ink from the first layer and the portion of the semi-dry ink from the second layer at substantially the same time within the application canvas to maintain visual fidelity when processing the ink input.

4. The method according to claim 1, wherein the transmitting of the portion of the semi-dry ink to the application further comprises: locking the second layer of the virtual buffer, clearing content from the second layer of the virtual buffer before unlocking the second layer, and unlocking the second layer based on the clearing of the content from the second layer.

5. The method according to claim 1, wherein the second layer of the virtual buffer is a transfer layer, and wherein the transfer layer is an intermediate frame buffer for the wet ink that is ready to be committed to the application canvas.

6. The method according to claim 5, wherein re-rendering of the wet ink further comprises: removing at least some of the rendered wet ink from the first layer, re-rendering the removed wet ink as semi-dry ink, and storing the semi-dry ink in the transfer layer.

7. The method according to claim 1, wherein the rendering of the received input to form the wet ink further comprises rendering the received input into a first portion of the wet ink and a second portion of the wet ink, and the re-rendering further comprises re-rendering the first portion of the wet ink and the second portion of the wet ink to generate a first portion of the semi-dry ink and a second portion of the semi-dry ink, and wherein the transmitting further comprises transmitting the first portion of wet ink and the first portion of the semi-dry ink to the application canvas for display.

8. The method according to claim 7, further comprising: polling the second layer to determine whether the second portion of the semi-dry ink is available to be transmitted to the application canvas, and transmitting the second portion of the wet ink and the second portion of the semi-dry ink to the application canvas based on a result of the polling.

9. A system comprising:
   at least one processor; and
   a memory operatively connected with the at least one processor, wherein the memory stores computer-executable instructions that, when executed by the at least one processor, causes the at least one processor to execute a method that comprises:
   receiving ink input,
   rendering, in a first layer of a virtual buffer, the received ink input as wet ink,
   re-rendering, in a second layer of the virtual buffer, the wet ink as semi-dry ink,
   transmitting a portion of the semi-dry ink and a portion of the wet ink to an application canvas, and
   displaying, within the application canvas, dry ink that comprises the portion of the wet ink and the portion of the semi-dry ink.

10. The system according to claim 9, wherein the dry ink is a digital representation generated by synchronously displaying the portion of the wet ink and the portion of the semi-dry ink within the application canvas of an application executing on a processing device.

11. The system according to claim 10, wherein the displaying displays the portion of the wet ink from the first layer and the portion of the semi-dry ink from the second layer at substantially the same time within the application canvas to maintain visual fidelity when processing the ink input.

12. The system according to claim 9, wherein the transmitting of the portion of the semi-dry ink to the application further comprises: locking the second layer of the virtual buffer, clearing content from the second layer of the virtual buffer before unlocking the second layer, and unlocking the second layer based on the clearing of the content from the second layer.

13. The system according to claim 9, wherein the second layer of the virtual buffer is a transfer layer, and wherein the transfer layer is an intermediate frame buffer for the wet ink that is ready to be committed to the application canvas.

14. The system according to claim 13, wherein re-rendering of the wet ink further comprises: removing at least some of the rendered wet ink from the first layer, re-rendering the removed wet ink as semi-dry ink, and storing the semi-dry ink in the transfer layer.

15. The system according to claim 9, wherein the rendering of the received input to form the wet ink further comprises rendering the received input into a first portion of the wet ink and a second portion of the wet ink, and the re-rendering further comprises re-rendering the first portion of the wet ink and the second portion of the wet ink to generate a first portion of the semi-dry ink and a second portion of the semi-dry ink, and wherein the transmitting further comprises transmitting the first portion of the wet ink and the first portion of the semi-dry ink to the application canvas for display.

16. The system according to claim 15, wherein the method further comprising: polling the second layer to determine whether the second portion of the semi-dry ink is available to be transmitted to the application canvas, and transmitting the second portion of the wet ink and the second portion of the semi-dry ink to the application canvas based on a result of the polling.

17. A method comprising:
    receiving ink input;
    rendering, in a first layer of a virtual buffer, the received ink input as wet ink that comprises a first portion of the wet ink and a second portion of the wet ink;
    re-rendering, in a second layer of the virtual buffer, the first portion of the wet ink as a first portion of semi-dry ink and the second portion of wet ink as a second portion of semi-dry ink;
    transmitting the first portion of wet ink and the first portion of semi-dry ink to an application canvas;
    displaying, within the application canvas, a first dry ink that comprises the first portion of the wet ink and the first portion of semi-dry ink;
    transmitting the second portion of the wet ink and the second portion of semi-dry ink to the application canvas; and
    updating display of the application canvas to include a second dry ink that comprises the second portion of the wet ink and the second portion of semi-dry ink.

18. The method according to claim 17, wherein the first dry ink is a digital representation generated by synchronously displaying the first portion of the wet ink and the first portion of semi-dry ink within the application canvas of an application executing on a processing device, and wherein the second dry ink is a digital representation generated by synchronously displaying the second portion of the wet ink and the second portion of semi-dry ink within the application canvas.

19. The method according to claim 17, wherein the second layer of the virtual buffer is a transfer layer, and wherein the transfer layer is an intermediate frame buffer for wet ink that is ready to be committed to the application canvas.

20. The method according to claim 17, further comprising polling the second layer to determine whether the second portion of semi-dry ink is available to be transmitted to the application canvas, and transmitting the second portion of the wet ink and the second portion of semi-dry ink to the application canvas based on a result of the polling.

* * * * *